(12) United States Patent
Shen et al.

(10) Patent No.: US 11,094,317 B2
(45) Date of Patent: Aug. 17, 2021

(54) SYSTEM AND METHOD FOR PERSONALIZED NATURAL LANGUAGE UNDERSTANDING

(71) Applicant: Samsung Electronics Co., Ltd., Suwon-si (KR)

(72) Inventors: Yilin Shen, Sunnyvale, CA (US); Xiangyu Zeng, Mountain View, CA (US); Yu Wang, Mountain View, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 16/404,012

(22) Filed: May 6, 2019

(65) Prior Publication Data
US 2020/0043480 A1 Feb. 6, 2020

Related U.S. Application Data

(60) Provisional application No. 62/712,773, filed on Jul. 31, 2018.

(51) Int. Cl.
*G10L 15/22* (2006.01)
*G10L 15/18* (2013.01)
(Continued)

(52) U.S. Cl.
CPC ........ *G10L 15/1815* (2013.01); *G10L 15/063* (2013.01); *G10L 15/183* (2013.01); *G10L 15/22* (2013.01); *G10L 15/16* (2013.01)

(58) Field of Classification Search
CPC ... G10L 15/22; G10L 15/1822; G10L 15/063; G10L 15/16
See application file for complete search history.

(56) References Cited

U.S. PATENT DOCUMENTS

| | | |
|---|---|---|
| 7,711,547 B2 | 5/2010 | Abir |
| 7,974,844 B2 | 7/2011 | Sumita |

(Continued)

FOREIGN PATENT DOCUMENTS

| | | |
|---|---|---|
| WO | 2017/143338 A1 | 8/2017 |
| WO | 2017/223010 A1 | 12/2017 |

OTHER PUBLICATIONS

Shen, Yilin, et al. "User Information Augmented Semantic Frame Parsing Using Progressive Neural Networks." INTERSPEECH. 2018. (Year: 2018).*

Liu, Bing, and Ian Lane. "Attention-based recurrent neural network models for joint intent detection and slot filling." arXiv preprint arXiv:1609.01454 (2016). (Year: 2016).*

(Continued)

*Primary Examiner* — Jialong He

(57) ABSTRACT

An electronic device for training a machine learning model includes at least one memory and at least one processor coupled to the at least one memory. The at least one processor is configured to train a classification layer of the model. To train the classification layer, the at least one processor is configured to receive, by the classification layer, one or more language contexts from an utterance encoder layer and to classify, by the classification layer, at least one portion of an utterance into an information type among a plurality of information types. The at least one processor may be further configured to jointly train a slot filling layer and an intent detection layer of the model.

27 Claims, 10 Drawing Sheets

(51) Int. Cl.
*G10L 15/06* (2013.01)
*G10L 15/183* (2013.01)
*G10L 15/16* (2006.01)

(56) References Cited

U.S. PATENT DOCUMENTS

| | | |
|---|---|---|
| 9,633,653 B1 | 4/2017 | Porter |
| 9,721,564 B2 | 8/2017 | Agarwal et al. |
| 2008/0033720 A1 | 2/2008 | Kankar et al. |
| 2009/0055164 A1 | 2/2009 | Hu et al. |
| 2014/0278413 A1 | 9/2014 | Pitschel et al. |
| 2016/0117593 A1 | 4/2016 | London |
| 2017/0169013 A1 | 6/2017 | Sarikaya et al. |
| 2017/0372199 A1 | 12/2017 | Hakkani-Tur et al. |
| 2017/0372200 A1* | 12/2017 | Chen ................ G10L 15/22 |
| 2018/0157638 A1 | 6/2018 | Li et al. |
| 2019/0385595 A1* | 12/2019 | Wabgaonkar ......... G06F 40/35 |

OTHER PUBLICATIONS

Huang, Lifu, et al. "Improving slot filling performance with attentive neural networks on dependency structures." arXiv preprint arXiv: 1707.01075 (2017). (Year: 2017).*

Zhang, Xiaodong, and Houfeng Wang. "A joint model of intent determination and slot filling for spoken language understanding." IJCAI. vol. 16. 2016. (Year: 2016).*

International Search Report and Written Opinion of the International Searching Authority in connection with International Patent Application No. PCT/KR2019/009474 dated Nov. 21, 2019, 8 pages.

Yang et al., "End-to-End Joint Learning of Natural Language Understanding and Dialogue Manager," 42nd IEEE International Conference on Acoustics, Speech and Signal Processing (ICASSP2017), Dec. 2016, 7 pages.

Supplementary European Search Report dated Jun. 1, 2021 in connection with counterpart European Patent Application No. 19843122.3, 9 pages.

* cited by examiner

SYSTEM AND METHOD FOR PERSONALIZED NATURAL LANGUAGE UNDERSTANDING

CROSS-REFERENCE TO RELATED APPLICATION AND CLAIM OF PRIORITY

This application claims priority under 35 U.S.C. § 119(e) to U.S. Provisional Patent Application No. 62/712,773 filed on Jul. 31, 2018 and entitled "A Method and System for Improved Spoken Language Understanding." This provisional patent application is hereby incorporated by reference in its entirety.

TECHNICAL FIELD

This disclosure relates generally to machine learning systems. More specifically, this disclosure relates to a system and method for personalized natural language understanding.

BACKGROUND

With the emergence of artificially-intelligent voice-enabled personal assistants in daily life, the field of natural language understanding (NLU) is growing. Semantic frame parsing is often an important component in NLU to guild spoken dialog systems. Semantic frame parsing often includes two main tasks, namely intent detection and slot filling. Slot filling includes extracting semantic constituents from a natural language utterance. Deep learning models for NLU often require not only a large-scale annotated dataset (a large-scale annotated corpus) but also a long training procedure. Since an NLU system aims to understand all varieties of user utterances, the corpus typically needs to extensively cover all varieties of utterances. However, the collection of such an annotated corpus is expensive and uses heavy human labor. To develop a new domain, a new utterance dataset has to be generated, and it takes a long time to train a new semantic frame parsing model.

SUMMARY

This disclosure provides a system and method for personalized natural language understanding.

In a first embodiment, a method for training a machine learning model includes training a classification layer of the model. Training the classification layer includes receiving, by the classification layer, one or more language contexts from an utterance encoder layer. Training the classification layer also includes classifying, by the classification layer, at least one portion of an utterance into an information type among a plurality of information types.

In a second embodiment, an electronic device for training a machine learning model includes at least one memory and at least one processor coupled to the at least one memory. The at least one processor is configured to train a classification layer of the model. To train the classification layer, the at least one processor is configured to receive, by the classification layer, one or more language contexts from an utterance encoder layer and to classify, by the classification layer, at least one portion of an utterance into an information type among a plurality of information types.

In a third embodiment, a non-transitory computer readable medium embodies a computer program for operating an electronic device including at least one processor. The computer program includes computer readable instructions that, when executed by the at least one processor, cause the electronic device to train a classification layer. The computer readable instructions that when executed cause the electronic device to train the classification layer include computer readable instructions that when executed cause the electronic device to receive, by the classification layer, one or more language contexts from an utterance encoder layer and to classify, by the classification layer, at least one portion of an utterance into an information type among a plurality of information types.

In a fourth embodiment, a method for natural language understanding includes classifying, by a classification layer, at least one portion of an utterance into an information type among a plurality of information types using one or more language contexts from an utterance encoder layer. The method also includes receiving, by a slot filling layer, the one or more language contexts from the utterance encoder layer and the classified at least one portion of the utterance from the classification layer. The method further includes filling, by the slot filling layer, one or more slots based on the one or more language contexts and the classified at least one portion of the utterance.

In a fifth embodiment, an electronic device for natural language understanding includes at least one memory and at least one processor coupled to the at least one memory. The at least one processor is configured to perform the method of the fourth embodiment or any of its dependent claims. In a sixth embodiment, a non-transitory computer readable medium contains computer readable program code that, when executed, causes at least one processor to perform the method of the fourth embodiment or any of its dependent claims.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 8E, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

Various embodiments of this disclosure alleviate the drawbacks of existing semantic frame parsing models by utilizing ubiquitous user information. In some embodiments, a progressive attention-based recurrent neural network (RNN) model or other machine learning system annotates information types and distills related prior knowledge of each information type to continue learning intent detection and slot filling. In particular embodiments, a main RNN structure is stacked with a set of different layers that are trained one-by-one in a progressive manner. The progressive attention-based RNN can be built using one or more electronic devices, such as the electronic devices described in this disclosure.

A semantic frame parse can be operated by these same electronic devices using the RNN or by different electronic devices. By using user information, various embodiments of this disclosure significantly improve performance and largely reduce the need for using annotated training sets. Also, various embodiments of this disclosure shorten training times for achieving performance, such as reaching the same performance as existing semantic frame parsing models while using significantly less annotated training samples (such as 80% fewer annotated training samples). The training time to achieve similar performance can also be significantly reduced (such as by over 60%). This disclosure thus enables a faster development of semantic frame parsing models with less annotated training sets in new domains.

Figure 1:
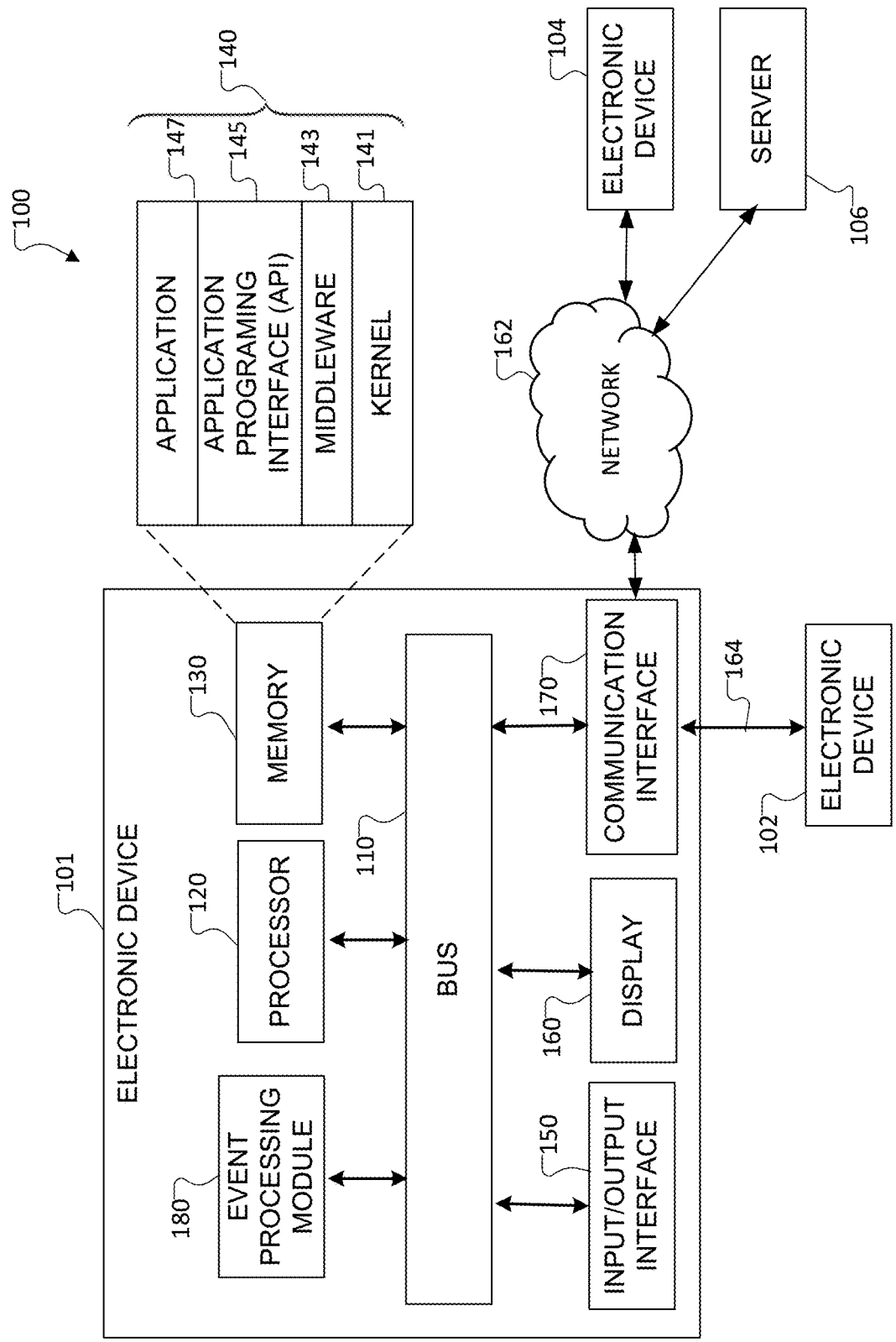
FIG. 1 illustrates an example network configuration in accordance with various embodiments of this disclosure.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can train or execute machine learning models, such as by receiving one or more language contexts, classifying at least one portion of an utterance into an information type, and receiving and filling one or more slots based on the one or more language contexts and the classified at least one portion of the utterance.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include an application that receives input utterance data for to provide services such as virtual assistant services including voice recognition and suggestions services, or other services. The application 147 can further include machine learning applications for classifying utterance data, filling slots using the classified utterance data, and determining intent from the utterance data by various processes described in this disclosure.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as signals received by the communication interface 170 regarding utterance data signals, information type classification signals, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
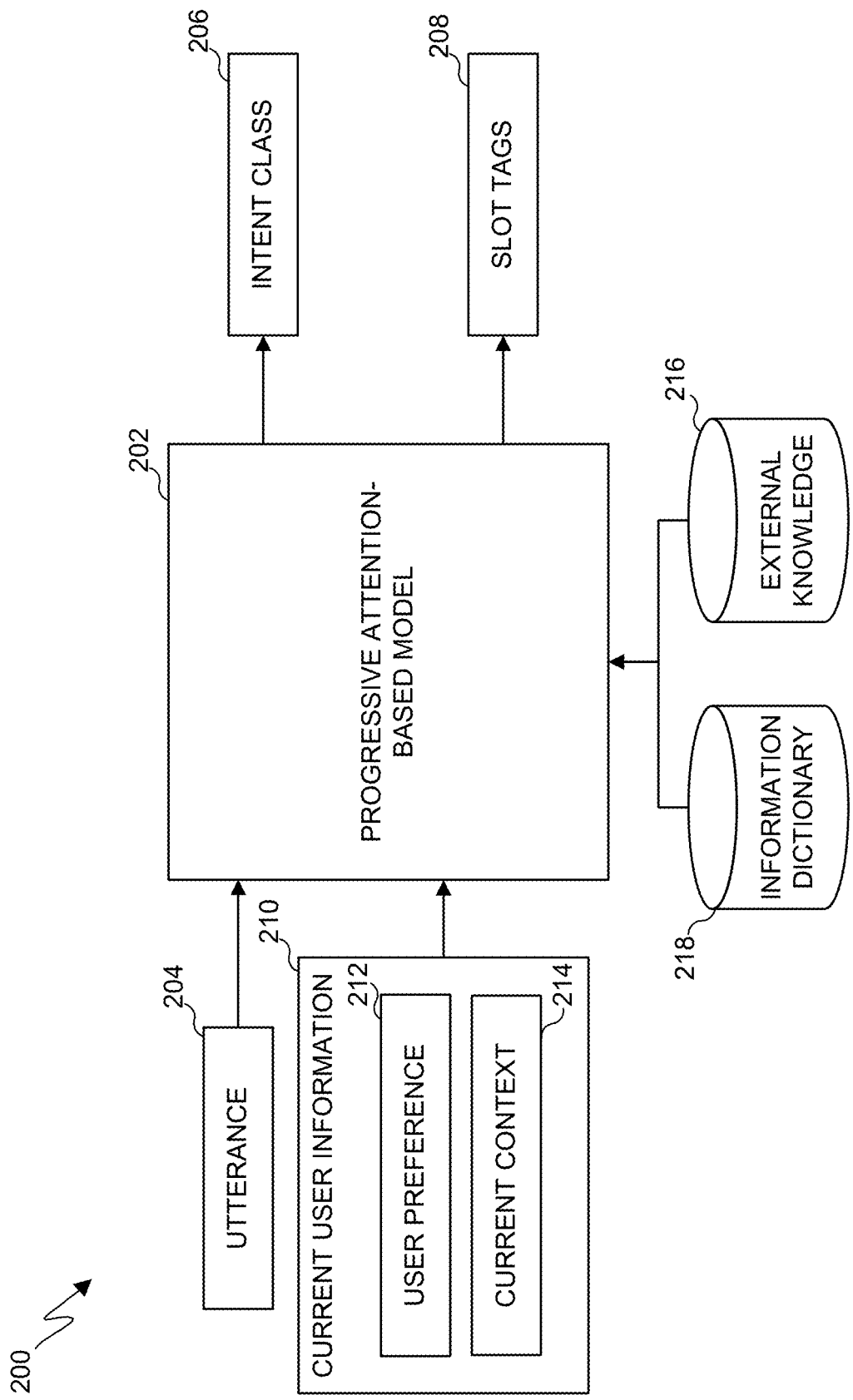
FIG. 2 illustrates an example machine learning architecture in accordance with various embodiments of this disclosure.

FIG. 2 illustrates an example machine learning architecture 200 in accordance with various embodiments of this disclosure. As shown in FIG. 2, the architecture 200 includes a progressive attention-based model 202. The model 202 is configured to receive utterances 204 and to determine and output an intent class 206 and slot tags 208. The model 202 is also configured to retrieve information from various sources to improve performance. In this example, these sources include current user information 210, such as user preferences 212 and current context 214.

The current user information 210 provides personalized information pertaining to a user providing an utterance 204 to the model 202. Existing personal assistants are designed to carry out the same intent for the same utterances for any user and in any situation. Such a universal NLU engine can fail to satisfy each user's different needs and could lead to wrong or even unfulfillable actions in different contexts. As a particular example, three different users could utter "find McDonald," with each user having a different intent. The intent behind an utterance 204 can be informed by the user preferences 212 of each user. The intent of a first of the three users may be to find contact information for a person named "McDonald." The user preferences 212 for this first user can indicate that the first user has a frequently used or referenced a stored contact named "McDonald," so the user preferences 212 can inform the model 202 that there is at least a higher likelihood that the first user intends for the utterance to pertain to a contact domain. If a second of the three users frequently goes to MCDONALDS to eat meals, the user preferences 212 for the second user can inform the model 202 that there is at least a higher likelihood that the second user intends for the utterance to pertain to a restaurant domain. If a third of the three users frequently listens to music by an artist named "Audra McDonald," the user preferences 212 for the third user can inform the model 202 that there is at least a higher likelihood that the third user intends for the utterance to pertain to a music domain.

The architecture 200 also includes external knowledge 216 that can inform the model 202 of the current context of users or other data. For example, to determine user preferences 212, the model 202 can retrieve user preference data for applications used by users, such as via an application programming interface (API) for the application, to retrieve data such as usage frequency, user searches or inputs, or other data from a device operated by the user or from remote devices.

As another particular example, three different users could utter the phrase "find me a ride," with each user having a different intent. The intent behind the utterance 204 can be informed by the current context 214 of each user. If a location of a first of the three users is San Francisco, the current context 214 can inform the model 202 that there is at least a higher likelihood that the first user intends for the utterance to pertain to a domain of a first rideshare service that is offered in the San Francisco area. If a second of the three users is currently located in Paris, France, the current context 214 can inform the model 202 that there is at least a higher likelihood that the second user intends for the utterance to pertain to a domain of a second rideshare service that is offered in Paris. If a third of the three users is located in Beijing, China, the current context 214 can inform the model 202 that there is at least a higher likelihood that the third user intends for the utterance to pertain to a domain of a third rideshare service that is offered in Beijing. The external knowledge 216 can inform the model 202 of the current context of users or other data, such as locations of users. For example, to determine the current context 214 for a user, the model 202 can retrieve the user's location from an external location or a global positioning system (GPS) based service, such as a GOOGLE MAPS distance matrix API.

The architecture 200 further includes an information dictionary 218. The information dictionary 218 is used by the model 202 to define categorical relations between user information types and NLU slots. In some embodiments, each key in the dictionary 218 is a type of user information, and the key's corresponding values are the slots belonging to this type. For example, a type of user information in the dictionary 218 can be a location information type (such as "@location"), and the slots associated with this location type can include a "from" location slot ("@fromloc") and a "to" location slot ("@toloc"). Each type of user information can also have an associated measurement metric. For instance, for a location information type, the measurement metric can be a geographical distance metric such that, by using the external knowledge 216, a current user location can be determined and used to determine a geographical distance between the current user location and a location uttered and assigned the location type from the information dictionary.

As another example, a type of user information in the dictionary 218 can be a user applications context type. The slots associated with the applications context type can include slots such as a contacts slot, a restaurants slot, a music slot, a rideshare slot, or other slots. Each type of user information can also have an associated measurement metric. For instance, for the applications context type, the measurement metric can be a user preference metric such that, by using the external knowledge 216, a current user preference for different applications can be determined (such as based on user application use frequency) and used to determine a frequency metric value for one or more applications. The architecture 200 thus incorporates user preferences, context information, external knowledge, and slot categories so that the preferred intents for users can be determined without using a large amount of historical personal utterance data.

Although FIG. 2 illustrates one example of a machine learning architecture 200, various changes may be made to FIG. 2. For example, the machine learning architecture 200 does not necessarily require access to all of the various types of data shown in FIG. 2 for every single implementation of the machine learning architecture 200. Other implementations of the machine learning architecture 200 may omit one or more of these types of data, and other or additional types of data can be used by the machine learning architecture 200.

Figure 3:
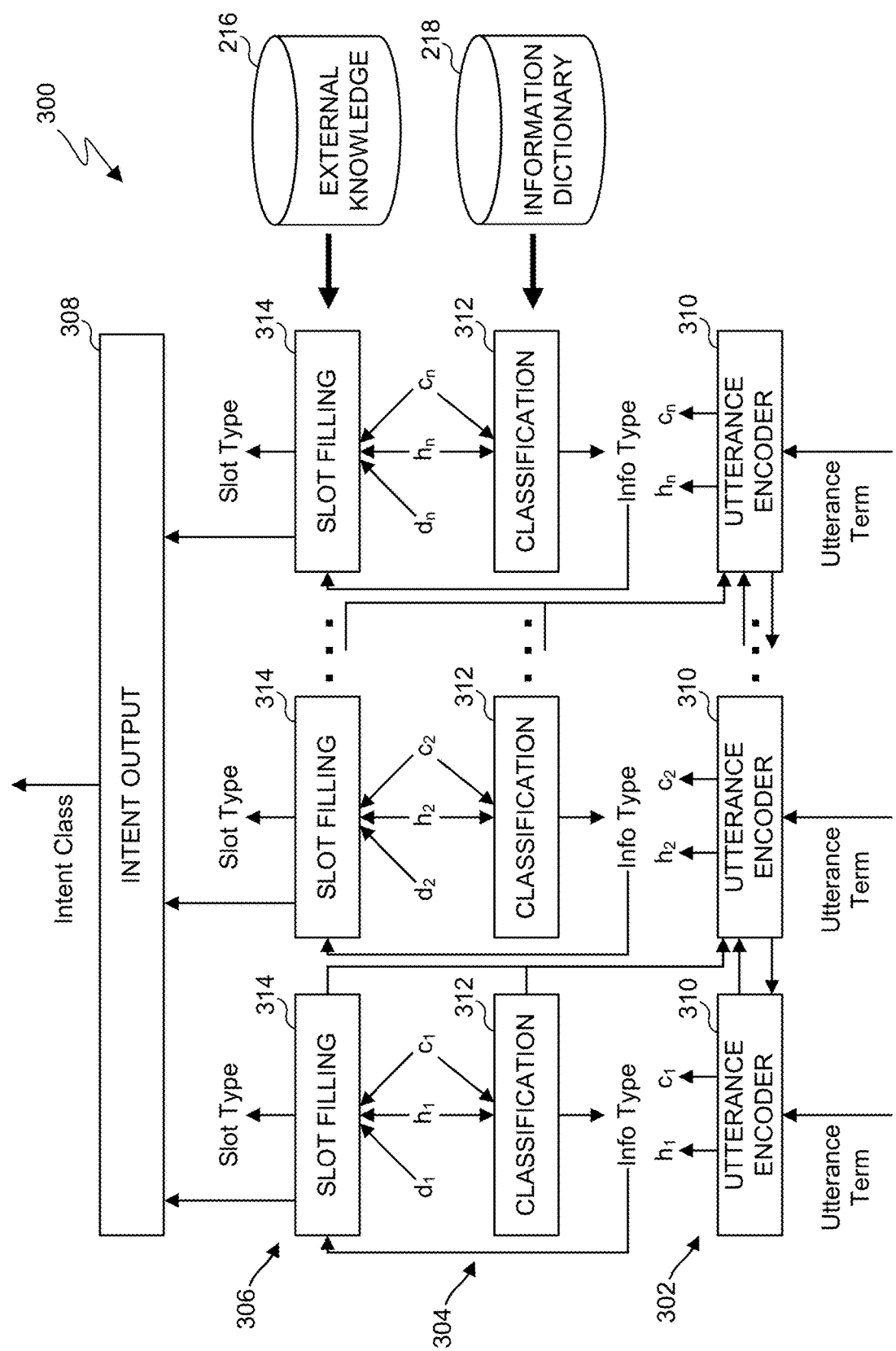
FIG. 3 illustrates an example machine learning model in accordance with various embodiments of this disclosure.

FIG. 3 illustrates an example machine learning model 300 in accordance with various embodiments of this disclosure. Intent detection and slot filling are two tasks performed by the model 300 for semantic frame parsing in NLU applications. One example goal or function of semantic frame parsing is to understand varieties of user utterances by correctly identifying user intents and tagging slots based on the intents. Intent detection can be treated as an utterance classification problem, which can be modeled using classifiers such as support vector machines (SVM) and recurrent neural networks (RNN) based models. As a sequence labeling problem, slot filling can be solved using machine learning approaches, such as maximum entropy Markov models and conditional random fields (CRF), as well as RNN-based approaches that tag each word in an utterance one-by-one.

As shown in FIG. 3, the model 300 includes an utterance encoder layer 302, a user information tagging or information type classification layer 304, a slot filling layer 306, and an intent detection layer 308. Given an input utterance as a sequence x of length T, intent detection identifies the intent class I for x, and slot filling maps x to the corresponding label sequence y of the same length T. As illustrated in FIG. 3, a number of occurrences of each cell in the model 300 can depend on the number of utterance tokens in an utterance, or the length of the utterance.

In some embodiments, the model 300 is a joint model that learns two tasks together, such as by including a bi-directional RNN as the utterance encoder layer 302. In these embodiments, the utterance encoder 310 may represent one or more long short-term memory (LSTM) cells that read an input utterance as a sequence x. At each time stamp t, a context vector $c_t$ is learned to concatenate with an RNN hidden state $h_t$—$c_t \oplus h_t$—to learn a slot attention for predicting the slot tag $y_t$. The hidden states of the slot filling layer 306 are used to predict the intent label in the intent detection layer 308. In these types of embodiments, the training objective of the model 300 could be defined to learn the joint distribution as follows.

$$P(y \mid x) = \max_{\theta_r, \theta_s, \theta_I} \prod_{t=1}^{T} P(y_t \mid y_1, \ldots, y_{t-1}, x; \theta_r, \theta_s, \theta_I) \quad (1)$$

In Equation (1), $\theta_r$, $\theta_s$, $\theta_I$ are trainable parameters of the utterance encoder layer 302, the slot filling layer 306, and the intent detection layer 308, respectively. In some embodiments, the information type classification layer 304 can use the information dictionary 218 to determine an information type associated with each slot type. The utterance encoder 310 receives and processes an utterance token and outputs a hidden state $h_t$ and a language context vector $c_t$. In some embodiments where the utterance encoder 310 uses bi-directional LSTM (BiLSTM) cells, outputs such as forward and backward states ($fh_t$, $bh_t$) can be passed bi-directionally as illustrated in FIG. 3. The utterance encoder 310 can also optionally receive data from the classification component 312 and the slot filling component 314 for a previous utterance token in order to provide data on previous tokens in the utterance to each subsequent utterance encoder 310. The utterance encoder 310 outputs a language context $c_t$ and a hidden state $h_t$. The hidden state $h_t$ at each time step t is the concatenation of a forward state $fh_t$ and a backward state $bh_t$ such that $h_t = fh_t \oplus bh_t$. It will be understood that the configuration of the utterance encoder 310 can include input, output, and forget gates to process the data received by the utterance encoder 310.

The classification component 312 in the information type classification layer 304 receives, at time t, the hidden state $h_{t-1}$ and the language context $c_{t-1}$ from the preceding utterance encoder 310. For example, as illustrated in FIG. 3, the utterance encoder 310 for the first utterance token in the utterance outputs $h_1$ and $c_1$, and $h_1$ and $c_1$ are passed to a classification component 312 for the first utterance token. The classification component 312 in the information type classification layer 304 labels each utterance token with a user information type. Since the labeling is based on the language context of the input utterance, in some embodiments, a language context vector $c_t$ is used at each time stamp t via a weighted sum of all hidden states, $\{h_k\} \forall 1 \le k \le T$, in which each $c_t = \sum_{k=1}^{T} \alpha_{t,k} h_k$ and where $\alpha_t$=softmax ($e_t$) such that $\alpha_{t,j}=$ $$\frac{\exp(e_{t,j})}{\sum_{k=1}^{T} \exp(e_{t,k})}.$$

In some embodiments, $e_{t,k} = g(s_{t-1}^u, h_k)$ can be learned from a feed forward neural network g with the previous hidden state $s_{t-1}^u$ defined as the concatenation of $h_{t-1}$ and $c_{t-1}$, $s_{t-1}^u = h_{t-1} \oplus c_{t-1}$. At each time step t, the information type classification layer 304 outputs $P_u(t)$, which may be defined as follows.

$$P_u(t) = softmax(W_u S_t^u); \tilde{z}_t = \underset{\theta_u}{\arg\max}\, P_u(t) \quad (2)$$

The slot filling layer 306 distills user information into the model. The slot filling layer 306 shares the same hidden states $h_t$ and language contexts $c_t$ with the information type classification layer 304 that were output from the utterance encoder layer 302. In some embodiments, each user information type is associated with an external or pre-trained model to extract semantically meaningful prior knowledge from the external knowledge 216 for use by the slot filling layer 306. For example, the semantics of a location can be represented by its latitude and longitude such that the distance between two locations reflects actual geographical distance. Each input sequence x is associated with its corresponding user information U, which could be represented as a set of tuples (Information Type, Information Content). For instance, from the external knowledge 216, it can be determined by the model 300 that, for a specific user, the Information Content is "Brooklyn, N.Y." for an Information Type of "User Location." For tagged words related to each type of user information, the model 300 uses the external knowledge 216 to derive the prior vectors $d_t = \{d_1, \ldots, d_t^{|U|}\}$ for each time stamp t, where |U| is the number of user information types in IOB format ("B" stands for the beginning word of a slot, "I" stands for the intermediate word of a slot, "O" means the word does not belong to any slot). In some embodiments, each element $d_t^j$ may be defined as follows.

$$d_t(j) = sigmold(\beta(j) \odot \delta_t^j) \quad (3)$$

In Equation (3), $\beta(j)$ is a trainable vector, and $\delta_t^j$ is a measurement metric based on the classification type and prior knowledge, where j is the classification type. The calculation of $\delta_t^j$ is defined for each information type j at time stamp t. For example, if the data from the external knowledge 216 is location data and the information type is a location type, let $\delta_t^{loc}$ be the distance, which can be defined as follows.

$$\delta_{loc} = dist([\text{uttered location}], [\text{external knowledge location}]) \approx x \text{ miles} \quad (4)$$

As a particular example, if the location "NYC" is uttered in a travel context, this utterance token can be classified with a location information type (such as "B-loc") in the information type classification layer 304. This indicates that the information type is a location of some kind (such as either a "fromloc" or "toloc" type). This B-loc information type is received by the slot filling layer 306 from the information type classification layer 304, along with the hidden states and language contexts from the utterance encoder layer 302. The location of the user can be determined from the external knowledge 216, such as by determining the user's location using an API of a GPS application. In this particular example, the location of the user may be determined to be "Brooklyn, N.Y." The measurement metric can thus be determined as follows.

$$\delta_{loc} = \text{dist}(\text{"NYC"}, \text{"Brooklyn, N.Y."}) \approx 4.8 \text{ miles}$$

It can be determined by the model 300 whether "NYC" uttered by the user is a "fromloc" type or a "toloc" type. In this example, since the user's context location "Brooklyn, N.Y." determined using the external knowledge 216 is about 4.8 miles from the uttered "NYC" location, the slot filling layer 306 is encouraged to assign the location "NYC" to the "B-fromloc" type. The model 300 can thus assign the utterance token to the proper slot without needing more training data to determine whether the location uttered by the user is a "fromloc" or "toloc."

To feed the vectors $d_t$ into the slot filling layer 306, in some embodiments, the slot filling layer 306 weighs each element $d_t^j$ and the language context $c_t$ over the softmax probability distribution $P_u(t)$ from the information type classification layer 304. This determines the importance of a type of user information or the language context in the utterance, which helps predict the slot tag of each word in the utterance. In some cases, the input $\Phi t$ of an LSTM cell at each time step t in the slot filling layer 306 may be defined as follows.

$$\Phi_t = P_u^1(t)d_t^1 \oplus \ldots \oplus P_u^m(t)d_t^m \oplus P_O(t)c_t \quad (5)$$

In Equation (5), $P_u^j(t)$ and $P_O(t)$ represent the probability that the $t^{th}$ word is predicted as the $j^{th}$ type of user information and as "O", where "O" designates none of the types. The state $s^s$ at time step t is computed as $h_t \oplus \Phi_t$, and the slot tag or information type classification can be predicted as follows.

$$P_s(t) = W_s s_t^s; \quad \tilde{y}_t = \underset{\theta_s}{\arg\max} P_s(t) \quad (6)$$

In some embodiments, once the slot filling layer 306 determines a slot type for an utterance token, the slot type and parameters from the slot filling layer 306 are passed to the intent detection layer 308. The intent detection layer 308 determines and outputs an intent class for the utterance. For example, if the utterance pertains to booking a flight, the intent detection layer 308 outputs a "flight" intent class. The intent detection layer 308 may also generate a probability distribution $P_I$ of intent class labels by using a concatenation of hidden states from the slot filling layer 306, such that $s^I = s^s \oplus \ldots \oplus s_T^s$. This may be defined as follows.

$$P_I(x) = P_I(s_I) = \text{softmax}(W_I S^I); \quad \tilde{I} = \underset{\theta_I}{\arg\max} P_I(x) \quad (7)$$

In some embodiments, for the information type classification layer 304, $h_t$ and $c_t$ are used to tag words that belong to one type of information. The semantic slots of these words can be tagged in the slot filling layer 306 by utilizing the distilled prior knowledge instead of using $h_t$ and $c_t$ again. The slot filling then depends on $h_t$ and $c_t$ to tag the rest of the words not belonging to any information types.

Although FIG. 3 illustrates one example of a machine learning model 300, various changes may be made to FIG. 3. For example, the machine learning model 300 may include any suitable number of utterance encoders 310, classification components 312, and slot filling components 314. Also, the machine learning model 300 is not necessarily required to use both the external knowledge 216 and the information dictionary 218 when processing each utterance.

Figure 4:
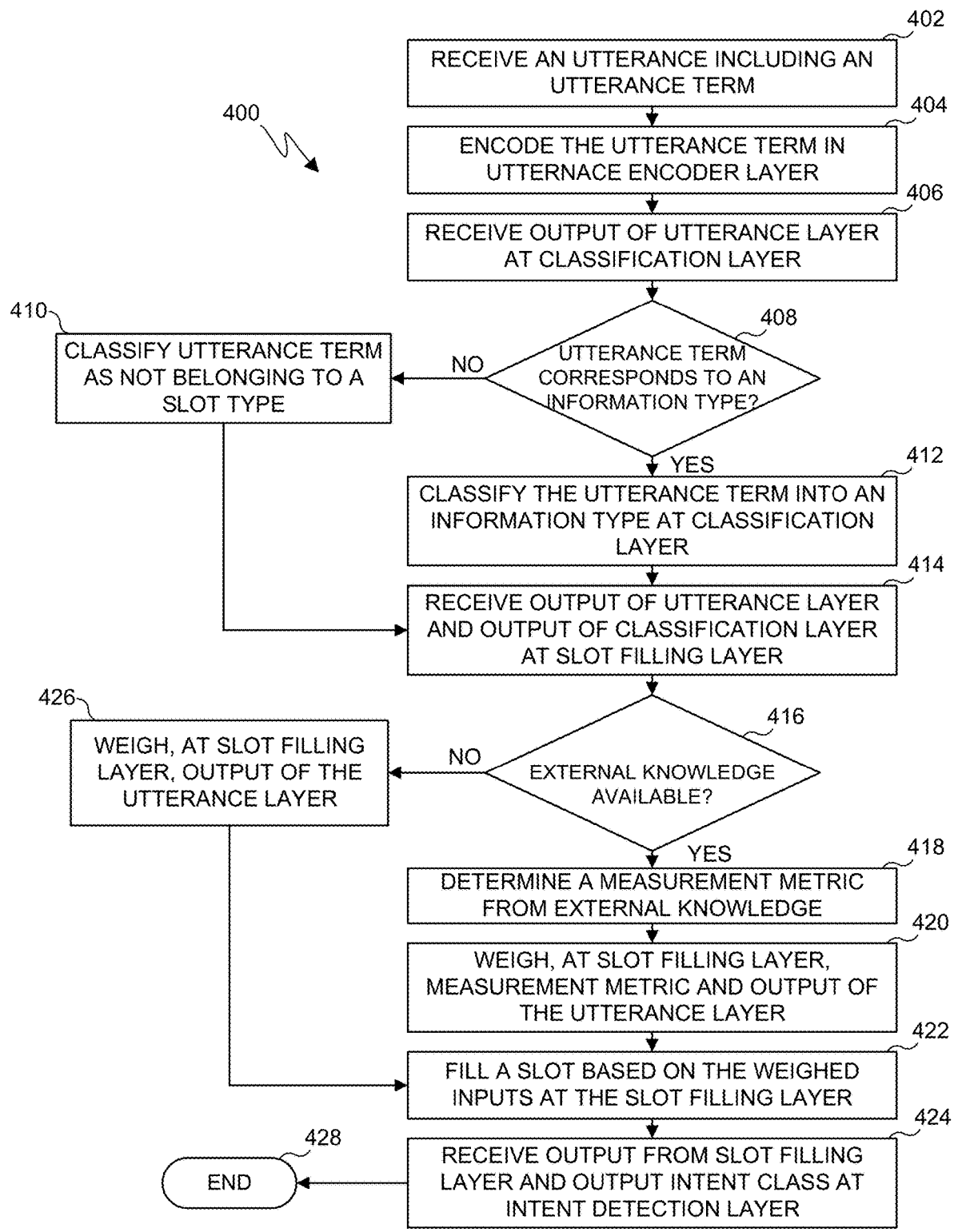
FIG. 4 illustrates an example semantic parsing process in accordance with various embodiments of this disclosure.

FIG. 4 illustrates an example semantic parsing process 400 in accordance with various embodiments of this disclosure. For ease of explanation, the process 400 may be described as being executed or otherwise used by the processor(s) 120 of any of the electronic devices 101, 102, 104 or the server 106 in FIG. 1. However, the process 400 may be used by any suitable device(s) and in any suitable system.

At block 402, the processor receives an utterance including at least one utterance token. At block 404, the processor encodes each utterance token in an utterance encoder layer, such as the utterance encoder layer 302. The utterance encoder 310 can be in various configurations, such as using hidden nodes or cells to process the utterance inputs received. In some embodiments, the utterance encoder 310 uses BiLSTM cells. In some embodiments, outputs from the utterance encoder 310 such as forward and backward states ($fh_t$, $bh_t$) can be passed bi-directionally at each time step t. The utterance encoder cell can also receive data from a classification layer cell and from a slot filling layer cell for another utterance token in order to provide data on other tokens in the utterance to the utterance encoder cell. In some embodiments, the utterance encoder cell outputs a language context $c_t$ and a hidden state $h_t$. The hidden state $h_t$ at each time step t can be the concatenation of the forward state $fh_t$ and the backward state $bh_t$ such that $h_t = fh_t \oplus bh_t$.

At block 406, the processor inputs the output(s) from the utterance encoder layer into a classification layer, such as the information type classification layer 304. Each classification cell in the classification layer receives a hidden state $h_t$ and a language context $c_t$ from a preceding utterance encoder layer cell. For example, the utterance encoder cell for the first utterance token outputs $h_1$ and $c_1$, and the processor passes $h_1$ and $c_1$ to a classification layer cell for the first utterance token. In some embodiments, the classification layer can use the information dictionary 218 to determine an information type associated with slot types. At decision block 408, for each utterance token received at the classification layer, the processor determines if the utterance token corresponds to an information type or category in the information dictionary 218. If not, at block 410, the processor classifies the utterance token as not belonging to a slot type and assigns the token an "O" if using IOB format. Otherwise, at block 412, the processor classifies the utterance token into an information type or category. The classification layer cell in the classification layer labels each utterance token with an information type. Since the labeling is based on the language context of the input utterance, in some embodiments, a language context vector $c_t$ is used at each time stamp t via the weighted sum of all hidden states as described above, which may involve the use of a feed forward neural network g.

At block 414, the processor inputs the output(s) of the utterance encoder layer and the output(s) of the classification layer into a slot filling layer, such as the slot filling layer 306. The slot filling layer 306 shares the same hidden states $h_t$ and language contexts $c_t$ with the information type classification layer 304 that were output from the utterance encoder layer 302. In some embodiments, each user information type is associated with an external or pre-trained model to extract semantically meaningful prior knowledge from the external knowledge 216.

At decision block 416, the processor determines if external knowledge is available based on the information type assigned to the utterance token at the classification layer. If so, at block 418, the processor determines a measurement metric based on the external knowledge 216. For example, the semantics of a location can be represented by its latitude and longitude such that distance between two locations reflects actual geographical distance. Each input sequence x can be associated with its corresponding user information U, which can be represented as a set of tuples. For example, from the external knowledge 216, it can be learned by the processor that, for a user, the Information Content is "Brooklyn, N.Y." for an Information Type of "User Location." As another example, if an utterance token is classified as a name type by the classification layer 304, the processor can use the external knowledge 216 to determine a measurement metric of application use frequency to determine the most likely use of the name. As yet another example, if the classification layer 304 classifies an utterance token as a preferred depart period, the associated slots can be @depart_time or @arrive_time, and the measurement metric can be a time different metric. For the tagged words related to each type of user information, the processor can use the external knowledge 216 to derive the prior vectors $d_t=\{d_1, \ldots, d_t^{|U|}\}$ for each time stamp t, where |U| is the number of user information types in IOB format. Each element $d_t^j$ can be defined by Equation (3) above.

At block 420, the processor weighs, at the slot filling layer, the measurement metric and the output from the utterance encoder layer. To feed the vectors $d_t$ into the slot filling layer, the processor can weigh each element $d_t^j$ and the language context $c_t$ over the softmax probability distribution $P_u(t)$ from the classification layer. This determines the importance of a type of user information or the language context in the utterance, which helps to predict the slot tag of each word in the utterance. The input of cells at each time step t in the slot filling layer can be defined by Equation (5) above, and the state $s^s$ at time step t can be computed as $h_t \oplus \Phi_t$ and the slot tag or information type classification can be predicted as defined in Equation (6) above.

If at decision block 416 the processor determines there is not external knowledge available for the information type assigned by the classification layer (such as if the classification layer assigns an "O" to the utterance token), at block 426, the processor weighs the output of the utterance encoder layer. In some embodiments, if the utterance token and the information type are of different types, the processor can set $\delta_t^j$ to be −1 such that its corresponding $d_t^j$ is to be close to zero.

At block 422, the processor uses the slot filling layer to fill a slot based on the inputs weighed at block 420 or 426. In some embodiments, once the slot filling layer 306 determines a slot type for an utterance token, at block 424, the processor passes the slot type and parameters from the slot filling layer 306 to an intent detection or output layer, such as the intent detection layer 308. The intent detection layer determines and outputs an intent class for the utterance. The intent detection layer may generate a probability distribution $P_I$ of intent class labels by using the concatenation of hidden states from the slot filling layer 306 as defined by Equation (7) above. The process ends at block 428.

Although FIG. 4 illustrates one example of a semantic parsing process 400, various changes may be made to FIG. 4. For example, while shown as a series of steps, various steps in FIG. 4 can overlap, occur in parallel, occur in a different order, or occur any number of times.

Figure 5:
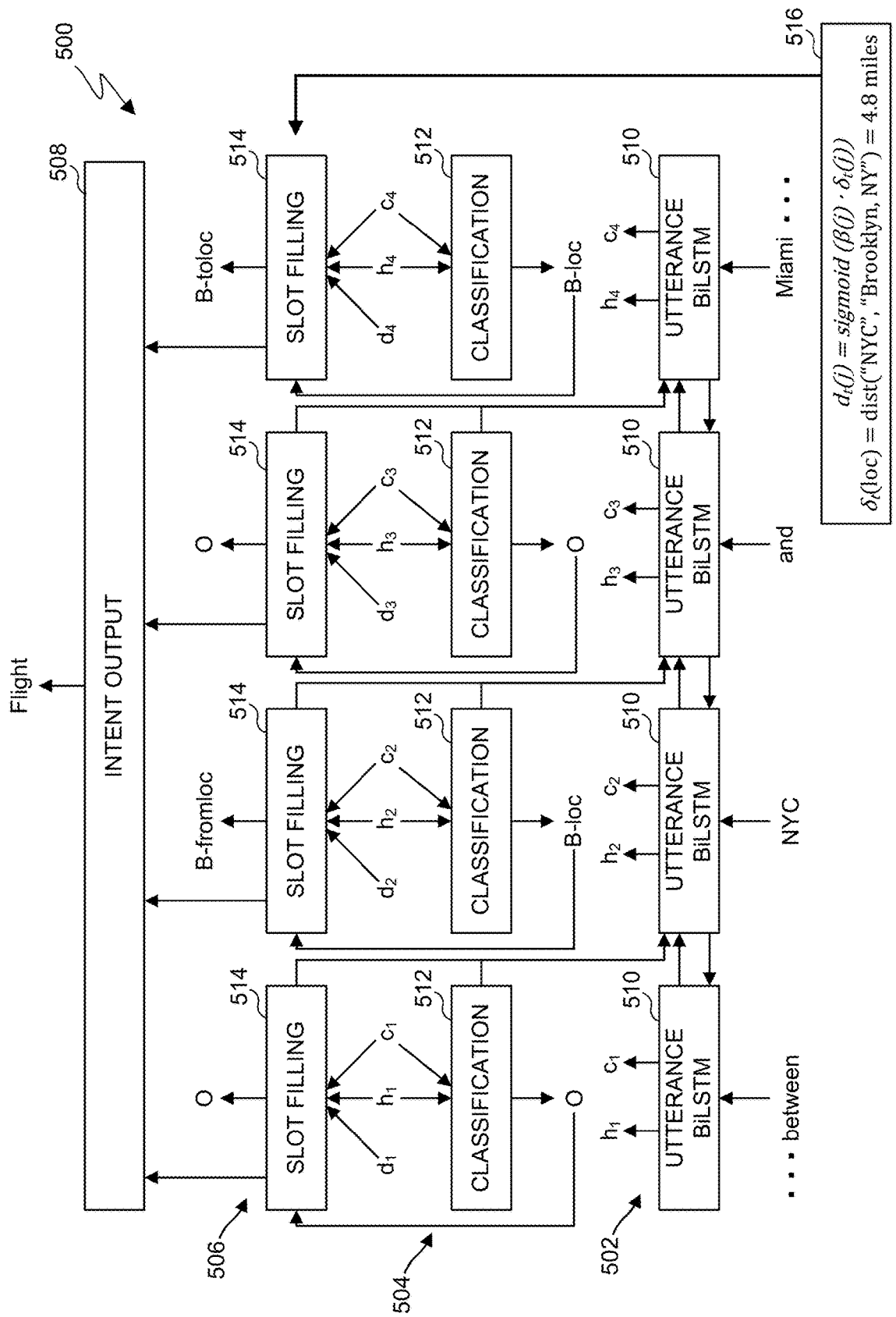
FIG. 5 illustrates an example machine learning model with an example utterance in accordance with various embodiments of this disclosure.

FIG. 5 illustrates an example machine learning model 500 with an example utterance in accordance with various embodiments of this disclosure. In some embodiments, the model 500 in FIG. 5 can represent the model 300 of FIG. 3 in a specific configuration, and it will be understood that the model 500 illustrates an example utterance input into the model. As shown in FIG. 5, the model 500 receives an utterance of "round trip flights between NYC and Miami." The model 500 in FIG. 5 is processing the utterance tokens "between," "NYC," "and," and "Miami." Note, however, that other components of the model 500 can be used to process the remaining utterance tokens.

Each utterance token is applied to an utterance BiLSTM cell 510 in an utterance encoder layer 502 of the model 500. The utterance BiLSTM cell encodes each utterance token. In some embodiments, outputs such as forward and backward states ($fh_t$, $bh_t$) of the utterance encoder cell can be passed bi-directionally as illustrated in FIG. 5. The utterance BiLSTM cell can also receive data from a classification layer cell 512 in a classification layer 504 and from a slot filling layer cell 514 in a slot filling layer 506 in order to provide data on other tokens in the utterance to the BiLSTM cell. The utterance BiLSTM cell 510 outputs language contexts $c_t$ and hidden states $h_t$. Each hidden state $h_t$ at each time step t is the concatenation of the forward state $fh_t$ and the backward state $bh_t$ such that $h_t = f\ h_t \oplus bh_t$.

In the classification layer 504, a classification cell 512 for an utterance token receives the outputs from the utterance encoder layer 502 for that token, where the outputs include the hidden state $h_t$ and the language context $c_t$. For example, as illustrated in FIG. 5, the utterance BiLSTM cell 510 for the first utterance token outputs $h_1$ and $c_1$, and a classification cell 512 receives $h_1$ and $c_1$. The utterance BiLSTM cell 510 for the second utterance token outputs $h_2$ and $c_2$, and classification cell 512 receives $h_2$ and $c_2$. The utterance BiLSTM cell 510 for the third utterance token outputs $h_3$ and $c_3$, and classification cell 512 receives $h_3$ and $c_3$. The utterance BiLSTM cell 510 for the fourth utterance token outputs $h_4$ and $c_4$, and classification cell 512 receives $h_4$ and $c_4$. The classification layer 504 determines if each utterance token corresponds to an information type or category in the information dictionary 218. The classification cell 512 classifies each utterance token. In the example illustrated in FIG. 5, the first token is classified as an "O" (meaning it does not belong to a slot type), the second token is classified as a location type or "B-loc" type, the third token is classified as an "O," and the fourth token is classified as a location type or "B-loc" type.

For each utterance x, a user information sequence z can be defined using the information dictionary 218. In some embodiments, the classification cell 512 is trained to derive z. Since the labeling is based on the language context of the input utterance, in some embodiments, the language context vector $c_t$ is used at each time stamp t via a weighted sum of all hidden states as described above. At each time step t, the classification layer 504 can output $P_u(t)$ as defined by Equation (2) above.

This example illustrates that the classification layer 504 can initially determine slot categories for certain tokens, and the slot filling layer 506 uses this information to more accurately determine which specific slots in the categories the tokens belong. For instance, "NYC" and "Miami" are both classified by the classification layer 504 as "B-loc" types, indicating that both utterance tokens are locations. The slot filling layer 506 can then determine to which location type slots the tokens belong, such as which token belongs to the "B-fromloc" slot and which token belongs to the "B-toloc" slot. Each slot filling cell 514 in the slot filling layer 506 receives the output of the utterance encoder layer 502, $h_t$ and $c_t$, and the output of the classification layer 504. For example, as illustrated in FIG. 5, the utterance BiLSTM cell 510 for the first utterance token outputs $h_1$ and $c_1$, and a slot filling cell 514 receives $h_1$ and $c_1$. The utterance BiLSTM cell 510 for the second utterance token outputs $h_2$ and $c_2$, and slot filling cell 514 receives $h_2$ and $c_2$. The utterance BiLSTM cell 510 for the third utterance token outputs $h_3$ and $c_3$, and slot filling cell 514 receives $h_3$ and $c_3$. The utterance BiLSTM cell 510 for the fourth utterance token outputs $h_4$ and $c_4$, and slot filling cell 514 receives $h_4$ and $c_4$.

The slot filling layer 506 uses the category types for utterance tokens output from the classification layer 504 to determine a measurement metric 516 based on the external knowledge 216. In this example, the locations "NYC" and "Miami" were uttered in a travel context and were classified as "B-loc" in the classification layer 504, indicating the information type is a location of some kind, such as either a "fromloc" or "toloc" type. This B-loc information type is received by the slot filling layer 506 from the classification layer 504, along with the hidden states and language contexts from the utterance encoder layer 502. The location of the user can be determined from the external knowledges 216, such as by determining the user's location using an API of a GPS application. In this example, the location of the user is determined to be "Brooklyn, N.Y." The measurement metric 516 can thus be determined, such as by using Equations (3) and (4) above. For the tagged words related to each type of user information, the model 500 uses the external knowledge 216 to derive the vectors $d_t = \{d_1, \ldots, d_t^{|U|}\}$ for each time stamp t. Each element $d_t^j$ can be defined by Equation (3) above.

The slot filling cell 514 weighs the measurement metric input $d_t$ and the output from the utterance encoder layer 502. For example, $d_1$ is input into slot filling cell 514 for the first utterance token, $d_2$ is input into slot filling cell 514 for the second utterance token, $d_3$ is input into slot filling cell 514 for the third utterance token, and $d_4$ is input into slot filling cell 514 for the fourth utterance token. To feed the vectors $d_t$ into the slot filling layer 506, the slot filling cell 514 can weigh each element $d_t^j$ and the language context $c_t$ over the softmax probability distribution $P_u(t)$ from the classification layer 504. This determines the importance of a type of user information or the language context in the utterance, which helps to predict the slot tag of each word in the utterance. The input of each cell at each time step t in the slot filling layer 506 can be defined by Equation (5) above, and the state $s^s$ at time step t can be computed as $h_t \oplus \Phi_t$ and the slot tag or information type classification can be predicted as defined in Equation (6) above.

In this example, it can be determined by the model 500 whether "NYC" uttered by the user is a "fromloc" type or a "toloc" type. Since the user location using the external knowledge 216 is determined to be 4.8 miles from the uttered "NYC" location and since the context location is "Brooklyn, N.Y.", the slot filling layer 506 is encouraged to assign the location "NYC" to the "B-fromloc" type. In a similar manner, the model 500 is encouraged to assign "Miami" to the "B-toloc" type since the user is not near Miami. The model 500 can thus assign the utterance tokens to the proper slots without needing more training data to determine whether each location uttered by the user is a "fromloc" or "toloc" slot type.

If the model 500 determines there is not external knowledge 216 available for the information type assigned by the classification layer 504 (such as when the classification layer 504 assigns an "O" to the utterance token), the model 500 at the slot filling layer 506 can weigh the outputs of the utterance encoder layer 502 and $d_t$ to reinforce the assignment of "O" as shown in FIG. 5 with respect to the "between" and "and" tokens. In some embodiments, if the utterance token and information type are of different types, the processor can set $\delta_t^j$ to be −1 such that its corresponding $d_t^j$ is to be close to 0.

Once the slot filling layer 506 determines a slot type for each utterance token, the output from the slot filling cell 514 in the slot filling layer 506 passes to an intent detection layer 508. The intent detection layer 508 determines and outputs an intent class for the utterance. In this example, since the utterance pertains to booking a flight between "NYC" and "Miami," the intent detection layer 508 outputs a "flight" intent class. To output the intent class, the intent detection layer 508 can generate a probability distribution $P_I$ of intent class labels by using the concatenation of hidden states from the slot filling layer 506, which can be defined by Equation (7) above. The information associated with the utterance and as processed by the model 500 in this example is listed in the following Table 1.

TABLE 1

| | Utterance (x) | | | | | | |
|---|---|---|---|---|---|---|---|
| | round | trip | flights | between | NYC | and | Miami |
| Slots (y) | B-round_trip | I-round_trip | ○ | ○ | B-FromLoc | ○ | B-ToLoc |
| Intent (I) | | | Flight | | | | |
| User Information (U) | | | ("User Location": "Brooklyn, NY") | | | | |
| User Information Sequence (z) | ○ | ○ | ○ | ○ | B-Loc | ○ | B-Loc |

Although FIG. 5 illustrates one example of a machine learning model 500 with an example utterance, various changes may be made to FIG. 5. For example, the machine learning model 500 may include any suitable number of utterance encoders 510, classification components 512, and slot filling components 514. As noted above, for instance, the numbers of utterance encoders 510, classification components 512, and slot filling components 514 can vary (at least in part) on the number of tokens including in the input utterance. Also, the type of utterance shown in FIG. 5 is for illustration only.

Figure 6:
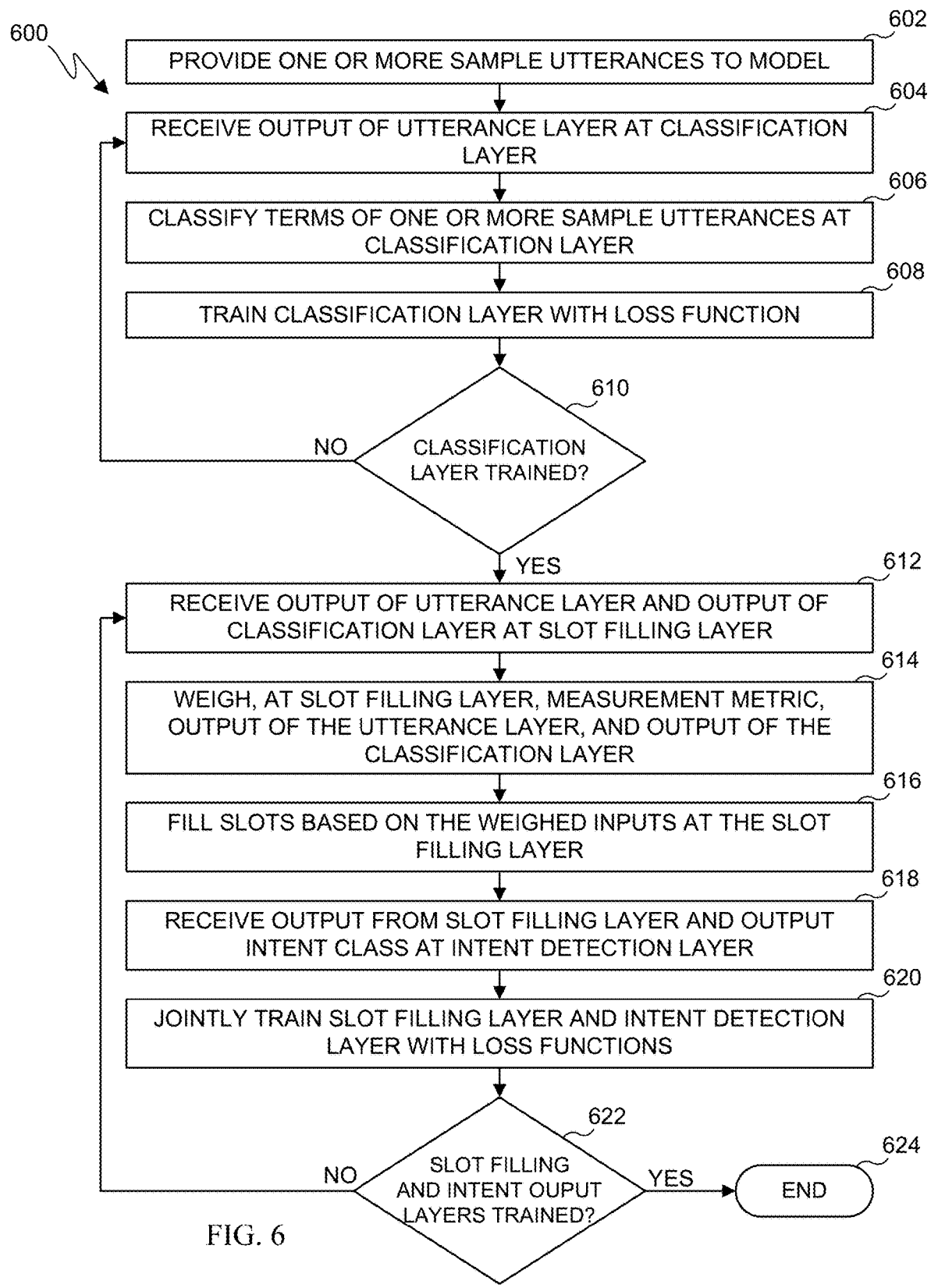
FIG. 6 illustrates an example machine learning model training process in accordance with various embodiments of this disclosure.

FIG. 6 illustrates an example machine learning model training process 600 in accordance with various embodiments of this disclosure. For ease of explanation, the process 600 may be described as being executed or otherwise used by the processor(s) 120 of any of the electronic devices 101, 102, 104 or the server 106 in FIG. 1. However, the process 600 may be used by any suitable device(s) and in any suitable system.

In some embodiments, training of a machine learning model (such as the model 300 or 500) can be conducted in a progressive step-by-step manner. For example, a classification layer (such as the information type classification layer 304) can be trained with an intermediate task, and slot filling and intent detection layers (such as the slot filling layer 306 and the intent detection layer 308) can then be jointly trained. Specifically, for each utterance x, a user information sequence z can be defined using the information dictionary 218 in a classification layer. In some embodiments, the classification cell is trained to derive z. Then, prior knowledge with semantic meaning for each type of user information can be distilled into the model to continue training for intent detection and slot tagging. Prior knowledge can include information such as geographic distance, application use frequency, or other information described in the various embodiments of this disclosure.

At block 602, the processor provides one or more sample utterances to be used for training a model, each sample utterance including one or more tokens that are labeled such as shown in Table 1. An utterance encoder layer, such as the utterance encoder layer 302, encodes the sample utterance and outputs results, such as hidden states and language contexts. In some embodiments where the utterance encoder 310 uses BiLSTM cells, the outputs of the utterance encoder cell can be passed bi-directionally. The utterance encoder cell can also receive data from a classification layer cell and from a slot filling layer cell for another utterance token in order to provide data on other tokens in the utterance to the utterance encoder cell. In some embodiments, the utterance encoder cell outputs language contexts $c_t$ and hidden states $h_t$.

At block 604, the processor inputs the output(s) from the utterance encoder layer into the classification layer. The classification cell in the classification layer receives the hidden state $h_t$ and the language context $c_t$ from a preceding utterance encoder layer cell. The classification layer can use the information dictionary 218 to determine an information type associated with each slot type. At block 606, the processor classifies each utterance token into an information type or category or classifies the token as not belonging to a slot category (such as assigning the token an "O"). The classification layer cell in the classification layer labels each utterance token with an information type. Since the labeling is based on the language context of the input utterance, in some embodiments, a language context vector $c_t$ is used at each time stamp t via the weighted sum of all hidden states as described above, which may involve the use of a feed forward neural network g.

At block 608, the processor trains the classification layer with a loss $L_u$ based on the output of the classification layers in this round of training. The loss $L_u$ can be defined as follows.

$$L_u(\theta_r, \theta_u) \triangleq -\frac{1}{n}\sum_{i=1}^{|U|}\sum_{t=1}^{n} z_t^i \log P_u^i(t) \quad (8)$$

In Equation (8), |U| is the number of user information types or categories in IOB format. At decision block 610, the processor determines if the classification layer is well-trained. If not, the process 600 returns to block 604 to receive, at the classification layer, more outputs generated from sample utterances by the utterance encoder layer for training.

Otherwise, the process 600 begins jointly training the slot filling layer and the intent detection layer. At block 612, the processor retrieves the outputs of the utterance encoder layer from the sample utterances and the information type outputs of the classification layer and inputs these outputs into the slot filling layer. In some embodiments, each user information type is associated with an external or pre-trained model to extract semantically meaningful prior knowledge from the external knowledge 216. The processor determines if external knowledge is available based on the information type assigned to the utterance token at the classification layer. If so, the processor determines a measurement metric based on the external knowledge 216. In some embodiments, for training the model, sample measurement metrics can be provided to the model. For the tagged words related to each type of user information, the processor derives vectors $d_t = \{d_1, \ldots, d_t^{|U|}\}$ for each time stamp t. Each element $d_t^j$ can be defined by Equation (3).

At block 614, the processor weighs, at the slot filling layer, the measurement metric and the output from the utterance encoder layer. To feed the vectors $d_t$ into the slot filling layer, the processor can weigh each element $d_t^j$ and the language context $c_t$ over the softmax probability distribution $P_u(t)$ from the classification layer. The input of each cell at each time step t in the slot filling layer can be defined by Equation (5) above, and the state $s^s$ at time step t can be computed as $h_t \oplus \Phi_t$, and the slot tag or information type classification can be predicted as defined in Equation (6) above.

At block 616, the processor using the slot filling layer fills one or more slots based on the weighed inputs provided to the slot filling layer. In some embodiments, once the slot filling layer determines a slot type for an utterance token, at block 618, the processor passes the slot type and parameters from the slot filling layer to the intent detection layer. The intent detection layer determines and outputs an intent class for the utterance based on the outputs from the slot filling layer. The intent detection layer can generate a probability distribution $P_I$ of intent class labels by using the concatenation of hidden states from the slot filling layer as defined by Equation (7) above. At block 620, the processor jointly trains the slot filling layer and the intent detection layer with losses $L_s$ and $L_I$. In some embodiments, $L_s$ and $L_I$ can be defined as follows.

$$L_s(\theta_r, \theta_I, \theta_s, \theta_u) \triangleq -\frac{1}{n}\sum_{i=1}^{|S|}\sum_{t=1}^{n} y_t^i \log P_s^i(t) \quad (9)$$

$$L_I(\theta_r, \theta_I, \theta_s, \theta_u) \triangleq -\sum_{i=1}^{|I|} I_x^i \log P_I^i(t) \quad (10)$$

In Equation (9), |S| is the number of slots in IOB format. In Equation (10), |I| is the number of intents. $P^i$ stands for the probability $P(X=xi)$. Here, $\theta_r, \theta_I, \theta_s, \theta_u$ are the parameters in the utterance encoder layer, the intent detection layer, the slot filling layer, and the classification layer, respectively. In some embodiments, the previously-trained parameters $\theta_u$ can be fine-tuned during joint training of the slot filling layer and the intent detection layer. At decision block 622, the processor determines if the slot filling layer and the intent detection layer are well-trained. If not, the process 600 returns to block 612 to jointly train the slot filling layer and the intent detection layer with additional sample inputs. Otherwise, the process 600 ends at block 624. The progressive training described with respect to FIG. 6 reduces the number of annotated training sets used for training, shortening training times and using less annotated training samples for new domains (compared to other natural language understanding (NLU) models).

Although FIG. 6 illustrates one example of a machine learning model training process 600, various changes may be made to FIG. 6. For example, while shown as a series of steps, various steps in FIG. 6 can overlap, occur in parallel, occur in a different order, or occur any number of times.

Figure 7:
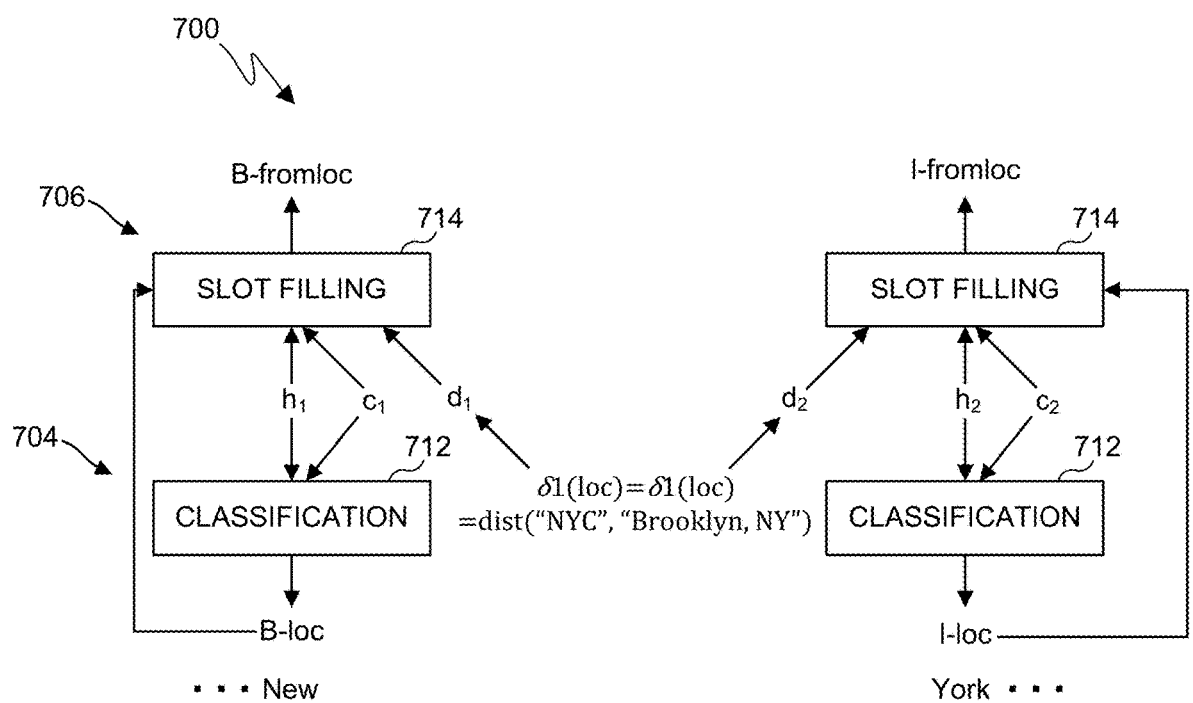
FIG. 7 illustrates example IOB format support for a machine learning model in accordance with various embodiments of this disclosure.

FIG. 7 illustrates example IOB format support for a machine learning model 700 in accordance with various embodiments of this disclosure. In some embodiments, the model 700 can represent at least a part of the model 300 or the model 500. Due to the progressive training procedure described above with respect to FIG. 6, the IOB format can be naturally supported by the model 700. The example illustrated in FIG. 7 shows that the utterance "New York" is applied to IOB format by the model 700 by separating "New" and "York" into separate tokens and assigning, by classifications cell 712 in a classification layer 704, IOB tags of "B-loc" to the token "New" and "I-loc" to the token "York." This indicates that "New" is a beginning token and that "York" is an intermediate or inside token.

Once classified, the tokens can be taken together to extract geographical distance, as one example, to supply slot filling cell 714 in a slot filling layer 706 with inputs $d_r$. Since B-Loc and I-Loc are considered as different tags in the output $P_u(t)$ of the classification layer 704, the tags can be used to infer "B-FromLoc" and "I-FromLoc" by the slot filling layer 706. With respect to the information type assigned by the classification layer 704, in the case that the $t^{th}$ word is incorrectly tagged, the hidden state $h_t$ and the language context $c_t$ can be used to infer the slot tags since the output from the classification layer $P_u(t)$ will more heavily weigh $h_t$ and $c_t$. In addition, the second phase of jointly training the layers of the model 700 also causes the model 700 to learn to use more language contexts to correct any incorrectly-tagged or incorrectly-categorized information types.

Although FIG. 7 illustrates one example of an IOB format support for a machine learning model 700, various changes may be made to FIG. 7. For example, other embodiments of a machine learning model need not use the IOB format.

Figure 8A:
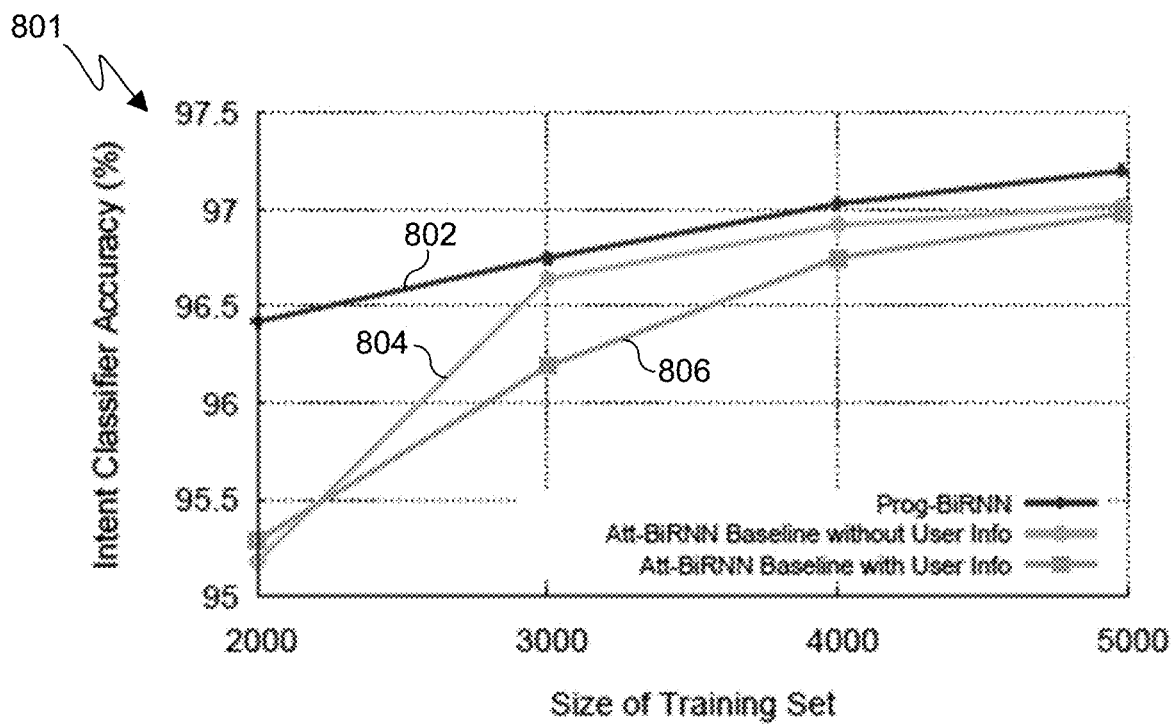
FIGS. 8A, 8B, 8C, 8D, and 8E illustrate example machine learning model performance graphs in accordance with various embodiments of this disclosure.
Figure 8B:
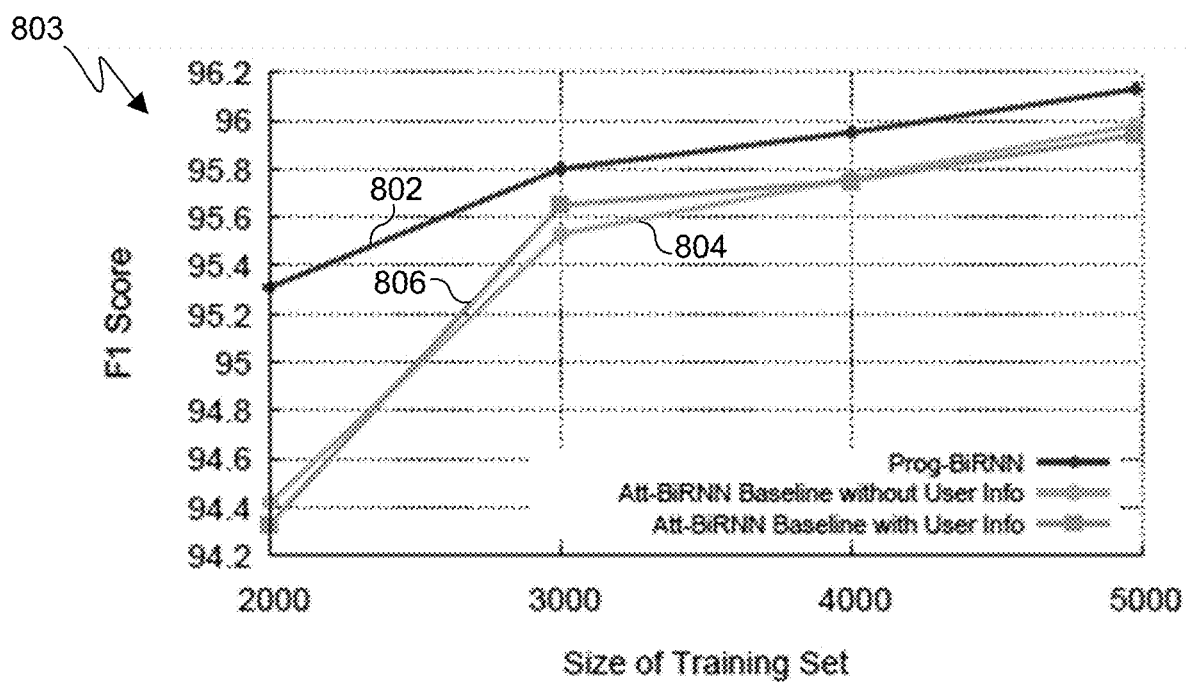
Figure 8C:
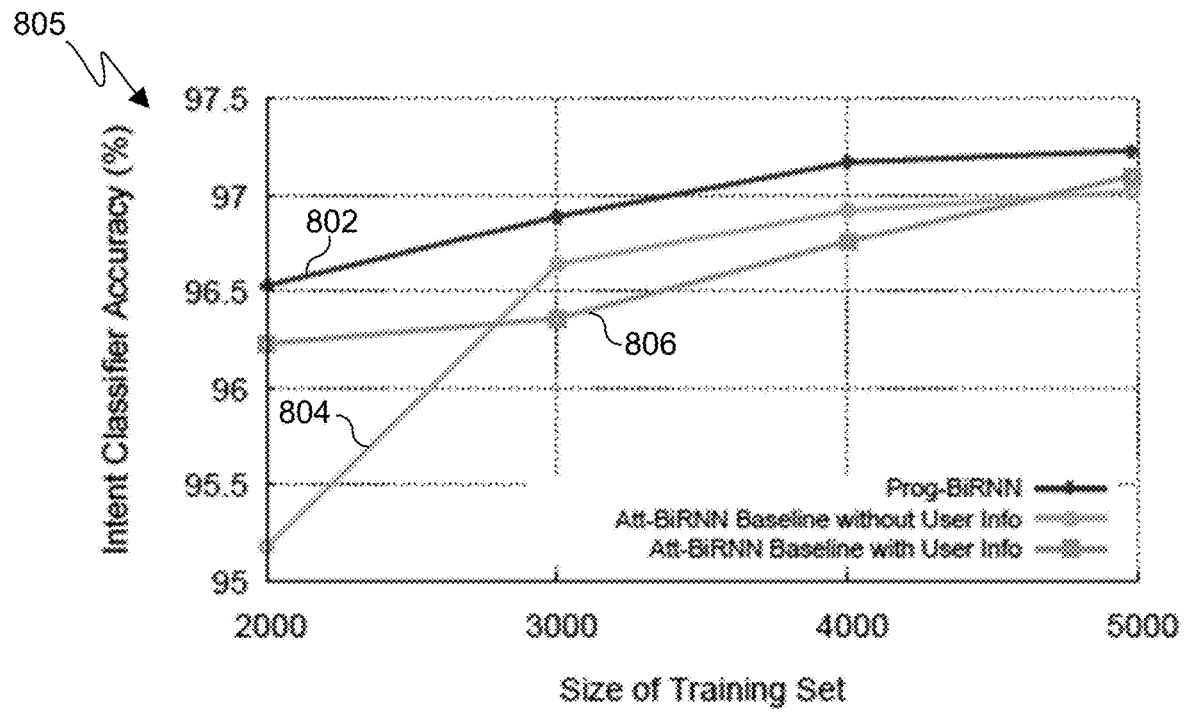
Figure 8D:
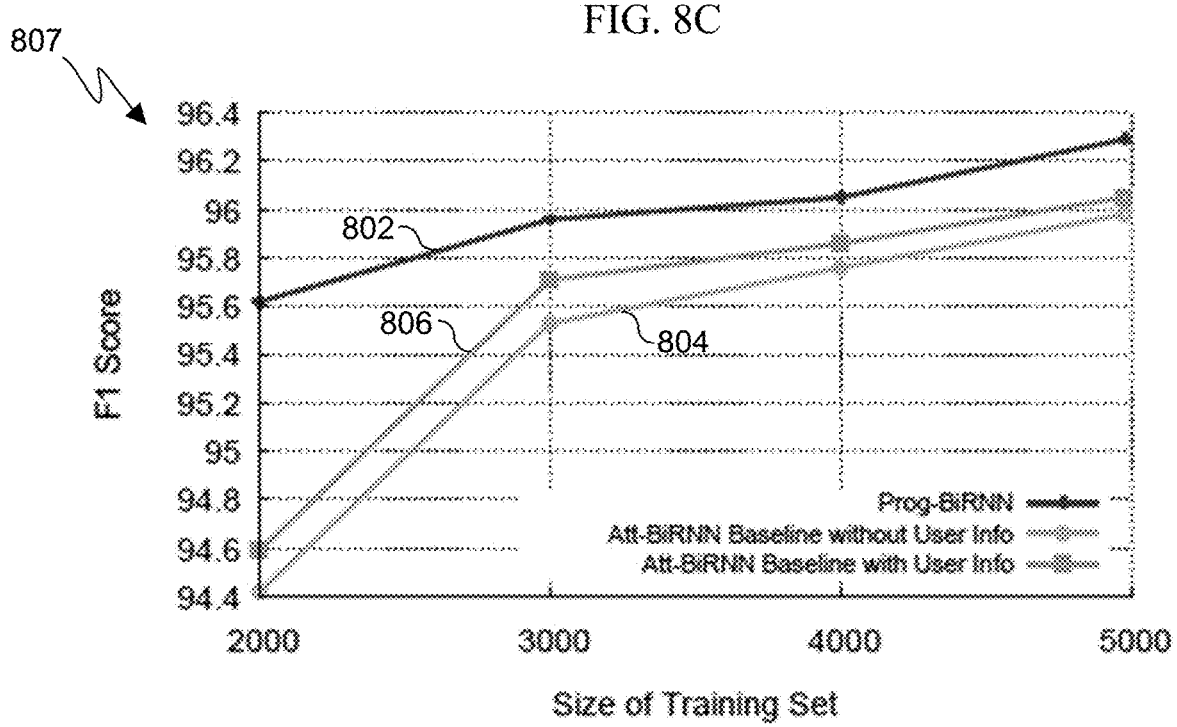
Figure 8E:
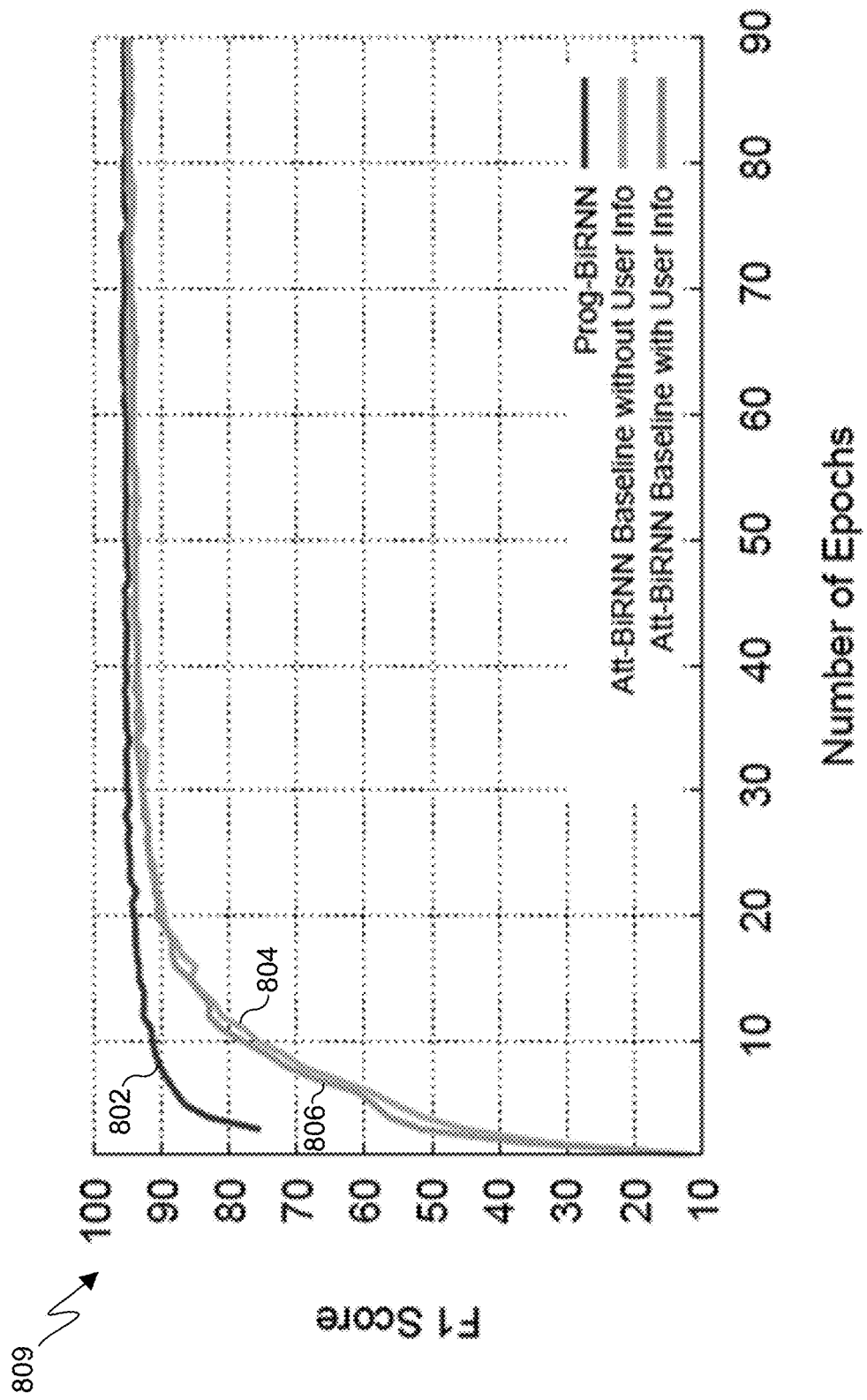

FIGS. 8A, 8B, 8C, 8D, and 8E illustrate example machine learning model performance graphs in accordance with various embodiments of this disclosure. In particular, FIG. 8A illustrates a graph 801 showing results of using contextual location information data in a training set as measured using an intent classification accuracy percentage. FIG. 8B illustrates a graph 803 showing results of using contextual location information data in a training set as measured using an F1 score. FIG. 8C illustrates a graph 805 showing results using contextual location information and preferred time periods data in a training set as measured using an intent classification accuracy percentage. FIG. 8D illustrates a graph 807 showing results using contextual location information and preferred time periods data in a training set as measured using an F1 score. FIG. 8E illustrates a graph 809 showing performance results based on a number of epochs used for training as measured using an F1 score.

As illustrated in FIGS. 8A, 8B, 8C, 8D, and 8E, each of the graphs 801, 803, 805, 807, and 809 shows a progressively trained bi-directional RNN line 802 representing the machine learning models described in this disclosure, such as the model 300, 500, or 700. Each of the graphs 801, 803, 805, 807, and 809 also shows an attention-based bi-directional RNN baseline without user information line 804 and an attention-based bi-directional baseline with user information line 806. As illustrated in FIGS. 8A, 8B, 8C, and 8D, using contextual location information only or in conjunction with preferred time periods, the line 802 representing the models described in this disclosure shows that results obtained using the models described in this disclosure have higher intent classifier accuracies and higher F1 scores, especially with smaller training set sizes.

In particular embodiments, performance improvements on intent detection and slot filling using the models described in this disclosure can reach up to 1.35% for intent detection and 1.20% for slot filling. Also, in particular embodiments, the models described in this disclosure can achieve similar performances as other models while using training sets that are 80% smaller than the training sets used by the other models. The use of less training data to achieve similar results as other models can enable more rapid development of NLU models for processing of varied utterances received from users. Additionally, the use of external knowledge and information type tagging allows for a personalized and contextual NLU model, even when actual personal data of the user is difficult to collect.

As illustrated in FIG. 8E, training time can also be reduced using the models described in this disclosure, since the models described in this disclosure can be trained using a smaller number of epochs while achieving a same or higher F1 score than other models (due to the progressive training process described in this disclosure). In particular embodiments, training time can be reduced by more than 60% compared to other models. Also, in particular embodiments, training of the information type classification phase can only take three epochs to achieve over 92% accuracy. In some scenarios, the faster training time enables the models described in this disclosure to be implemented on a local device, such as a mobile device. Implementing a model on a device can increase the security of the personal user information used in the model.

Although FIGS. 8A, 8B, 8C, 8D, and 8E illustrate examples of machine learning model performance graphs, various changes may be made to these figures. For example, the performances shown in these figures are for illustration only. Other implementations of the approaches and techniques described in this patent document can operate in ways other than shown in these figures. Also, the specific numerical values provided above (such as percentages, scores, and number of epochs) are for illustration only and do not limit this disclosure to any particular implementations or performances.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method for training a machine learning model, the method comprising:
jointly training a slot filling layer and an intent detection layer of the machine learning model, including:
receiving, by the slot filling layer, one or more language contexts from an utterance encoder layer and a classified at least one portion of an utterance from a classification layer;
acquiring, by the slot filling layer, an external knowledge parameter;
determining at least one measurement metric based on the external knowledge parameter; and
weighing, by the slot filling layer, the at least one measurement metric, the classified at least one portion of the utterance, and at least one of the one or more language contexts to determine a slot type.

2. The method of claim 1, further comprising:
training the classification layer of the machine learning model, including:
receiving, by the classification layer, the one or more language contexts from the utterance encoder layer; and
classifying, by the classification layer, the at least one portion of the utterance into an information type among a plurality of information types.

3. The method of claim 2, wherein classifying the at least one portion of the utterance includes applying at least one language context of the one or more language contexts to a weighted sum of hidden states at one or more time stamps.

4. The method of claim 1, further comprising:
determining, by the intent detection layer, an intent based on the one or more language contexts and the classified at least one portion of the utterance.

5. The method of claim 1, wherein the at least one measurement metric is determined by a function of an information type vector and the external knowledge parameter at a time stamp.

6. The method of claim 1, wherein the external knowledge parameter is location data;
wherein the at least one measurement metric is a distance metric;
wherein the classified at least one portion of the utterance is classified as a location type; and
wherein determining the at least one measurement metric includes calculating the distance metric based on the location data and a location defined by the classified at least one portion of the utterance.

7. The method of claim 1, wherein the external knowledge parameter is user preference data;
wherein the at least one measurement metric is a use frequency metric; and
wherein determining the at least one measurement metric includes calculating the use frequency metric based on the at least one portion of the utterance and the user preference data.

8. An electronic device for training a machine learning model, the electronic device comprising:
at least one memory; and
at least one processor coupled to the at least one memory, wherein the at least one processor is configured to jointly train a slot filling layer and an intent detection layer of the machine learning model;
wherein, to jointly train the slot filling layer and the intent detection layer of the machine learning model, the at least one processor is configured to:
receive, by the slot filling layer, one or more language contexts from an utterance encoder layer and a classified at least one portion of an utterance from a classification layer;
acquire, by the slot filling layer, an external knowledge parameter;
determine at least one measurement metric based on the external knowledge parameter; and
weigh, by the slot filling layer, the at least one measurement metric, the classified at least one portion of the utterance, and at least one of the one or more language contexts to determine a slot type.

9. The electronic device of claim 8, wherein:
the at least one processor is further configured to train the classification layer of the machine learning model; and
to train the classification layer of the machine learning model, the at least one processor is configured to:
receive, by the classification layer, the one or more language contexts from the utterance encoder layer; and
classify, by the classification layer, the at least one portion of the utterance into an information type among a plurality of information types.

10. The electronic device of claim 9, wherein, to classify the at least one portion of the utterance, the at least one processor is configured to apply at least one language context of the one or more language contexts to a weighted sum of hidden states at one or more time stamps.

11. The electronic device of claim 8, wherein the at least one processor is further configured to determine, by the intent detection layer, an intent based on the one or more language contexts and the classified at least one portion of the utterance.

12. The electronic device of claim 8, wherein the at least one measurement metric is determined by a function of an information type vector and the external knowledge parameter at a time stamp.

13. The electronic device of claim 8, wherein the external knowledge parameter is location data;
wherein the at least one measurement metric is a distance metric;
wherein the classified at least one portion of the utterance is classified as a location type; and
wherein, to determine the at least one measurement metric, the at least one processor is configured to calculate the distance metric based on the location data and a location defined by the classified at least one portion of the utterance.

14. The electronic device of claim 8, wherein the external knowledge parameter is user preference data;
wherein the at least one measurement metric is a use frequency metric; and
wherein, to determine the at least one measurement metric, the at least one processor is configured to calculate the use frequency metric based on the at least one portion of the utterance and the user preference data.

15. A non-transitory computer readable medium embodying a computer program for operating an electronic device including at least one processor, the computer program comprising computer readable instructions that, when executed by the at least one processor, cause the electronic device to jointly train a slot filling layer and an intent detection layer of a machine learning model;

wherein the computer readable instructions that when executed cause the electronic device to jointly train the slot filling layer and the intent detection layer of the machine learning model include computer readable instructions that when executed cause the electronic device to:

receive, by the slot filling layer, one or more language contexts from an utterance encoder layer and a classified at least one portion of an utterance from a classification layer;

acquire, by the slot filling layer, an external knowledge parameter;

determine at least one measurement metric based on the external knowledge parameter; and weigh, by the slot filling layer, the at least one measurement metric, the classified at least one portion of the utterance, and at least one of the one or more language contexts to determine a slot type.

16. The non-transitory computer readable medium of claim 15, wherein the computer program further comprises computer readable instructions that, when executed by the at least one processor, cause the electronic device to train the classification layer of the machine learning model;

wherein the computer readable instructions that when executed cause the electronic device to train the classification layer of the machine learning model include computer readable instructions that when executed cause the electronic device to:

receive, by the classification layer, the one or more language contexts from the utterance encoder layer; and classify, by the classification layer, the at least one portion of the utterance into an information type among a plurality of information types.

17. The non-transitory computer readable medium of claim 15, wherein the computer program further comprises computer readable instructions that, when executed by the at least one processor, cause the electronic device to:

determine, by the intent detection layer, an intent based on the one or more language contexts and the classified at least one portion of the utterance.

18. The non-transitory computer readable medium of claim 15, wherein the at least one measurement metric is determined by a function of an information type vector and the external knowledge parameter at a time stamp.

19. The non-transitory computer readable medium of claim 15, wherein the external knowledge parameter is location data;

wherein the at least one measurement metric is a distance metric;

wherein the classified at least one portion of the utterance is classified as a location type; and wherein the computer program further comprises computer readable instructions that, when executed by the at least one processor, cause the electronic device to calculate the distance metric based on the location data and a location defined by the classified at least one portion of the utterance.

20. The non-transitory computer readable medium of claim 15, wherein the external knowledge parameter is user preference data;

wherein the at least one measurement metric is a use frequency metric; and wherein the computer program further comprises computer readable instructions that, when executed by the at least one processor, cause the electronic device to calculate the use frequency metric based on the at least one portion of the utterance and the user preference data.

21. A method for natural language understanding, the method comprising:

receiving, by a slot filling layer, one or more language contexts from an utterance encoder layer and a classified at least one portion of an utterance from a classification layer;

acquiring, by the slot filling layer, an external knowledge parameter;

determining at least one measurement metric based on the external knowledge parameter; and weighing, by the slot filling layer, the at least one measurement metric, the classified at least one portion of the utterance, and at least one of the one or more language contexts to determine a slot type.

22. The method of claim 21, further comprising:

classifying, by the classification layer, the at least one portion of the utterance into an information type among a plurality of information types using the one or more language contexts from the utterance encoder layer.

23. The method of claim 22, wherein classifying the at least one portion of the utterance includes applying at least one language context of the one or more language contexts to a weighted sum of hidden states at one or more time stamps.

24. The method of claim 21, further comprising:

determining, by an intent detection layer, an intent based on the one or more language contexts and the classified at least one portion of the utterance.

25. The method of claim 21, wherein the at least one measurement metric is calculated by a function of an information type vector and the external knowledge parameter at a time stamp.

26. The method of claim 21, wherein the external knowledge parameter is location data;

wherein the at least one measurement metric is a distance metric;

wherein the classified at least one portion of the utterance is classified as a location type; and wherein determining the at least one measurement metric includes calculating the distance metric based on the location data and a location defined by the classified at least one portion of the utterance.

27. The method of claim 21, wherein the external knowledge parameter is user preference data;

wherein the at least one measurement metric is a use frequency metric; and wherein determining the at least one measurement metric includes calculating the use frequency metric based on the at least one portion of the utterance and the user preference data.

* * * * *